(12) United States Patent
Berry et al.

(10) Patent No.: US 9,792,442 B2
(45) Date of Patent: Oct. 17, 2017

(54) VISUALIZATION OF SECURITY RISKS

(71) Applicant: HEWLETT-PACKARD DEVELOPMENT COMPANY, L.P., Fort Collins, CO (US)

(72) Inventors: Kevin Berry, Alpharetta, GA (US); Michael Right, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 199 days.

(21) Appl. No.: 14/634,563

(22) Filed: Feb. 27, 2015

(65) Prior Publication Data
US 2016/0253503 A1 Sep. 1, 2016

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .................................................. G06F 21/577
USPC .......................................................... 726/25
See application file for complete search history.

(56) References Cited

U.S. PATENT DOCUMENTS

| | | | |
|---|---|---|---|
| 7,890,869 B1 * | 2/2011 | Mayer | G06F 21/577 709/224 |
| 8,429,059 B2 | 4/2013 | Rosenthal | |
| 2007/0162976 A1 * | 7/2007 | Anderson | G06F 21/577 726/25 |
| 2010/0225661 A1 | 9/2010 | Gorisch et al. | |
| 2014/0200953 A1 | 7/2014 | Mun | |

OTHER PUBLICATIONS

Andrew Jaquith, "Security Metrics: Replacing Fear, Uncertainty, and Doubt," Mar. 2007, pp. 1-335, Pearson Education, Inc., Upper Saddle River, New Jersey, USA.
Chris Cain and Erik Couture, "Establishing a Security Metrics Program," Tiger Team Final Report, Oct. 2011, pp. 1-12, SANS Technology Institute.
David P. Gilliam and Martin S. Feather, "Security Engineering: Systems Engineering of Security through the Adaptation and Application of Risk Management," May 14, 2004 pp. 1-11.
P.A. Abuodha and C.D. Woodroffe, "Assessing Vulnerability of Coasts to Climate Change: A Review of Approaches and their Application to the Australian Coast," 2006, pp. 1-18 University of Wollongong, Australia.

* cited by examiner

*Primary Examiner* — Jacob Lipman
(74) *Attorney, Agent, or Firm* — Hewlett Packard Enterprise Patent Department (57) ABSTRACT

Examples disclosed herein relate to visualization of security risks. The examples enable obtaining counts of security risks found in a plurality of applications. The obtained counts may comprise a count of security risks associated with each of a plurality of severity levels found in a first application of the plurality of applications. The examples further enable determining, based on the obtained counts, a first maximum count of security risks associated with a first severity level of the plurality of severity levels found in the plurality of applications. The examples further enable determining a bar length of a first bar to be included in a bar graph based on the first maximum count and the count of security risks associated with the first severity level found in the first application.

20 Claims, 6 Drawing Sheets

VISUALIZATION OF SECURITY RISKS

BACKGROUND

Applications are exposed to and/or contain various security risks (e.g., security vulnerabilities) that can be exploited by different types of attacks. A number of so-called scanning tools, for example, exist for scanning an application to assess the security risks and/or vulnerabilities of various aspects of the application. The security risks that have been found in the application may be analyzed to identify and/or create a remediation for the risks found.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Applications are exposed to and/or contain various security risks (e.g., security vulnerabilities) that can be exploited by different types of attacks. A number of so-called scanning tools, for example, exist for scanning an application to assess the security risks and/or vulnerabilities of various aspects of the application. The security risks that have been found in the application may be analyzed to identify and/or create a remediation for risks found. Thus, it may typically expend a large amount of labor and resources to identify and/or create a remediation for each risk found for a large number of applications and then even more labor to implement the vulnerability remediation on the affected applications.

Examples disclosed herein provide technical solutions to these challenges by providing a tool for visualizing security risks found in a plurality of applications. The examples enable obtaining counts of security risks found in a plurality of applications. The obtained counts may comprise a count of security risks associated with each of a plurality of severity levels found in a first application of the plurality of applications. The examples further enable determining, based on the obtained counts, a first maximum count of security risks associated with a first severity level of the plurality of severity levels found in the plurality of applications. The examples further enable determining a bar length of a first bar to be included in a bar graph based on the first maximum count and the count of security risks associated with the first severity level found in the first application.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Figure 1:
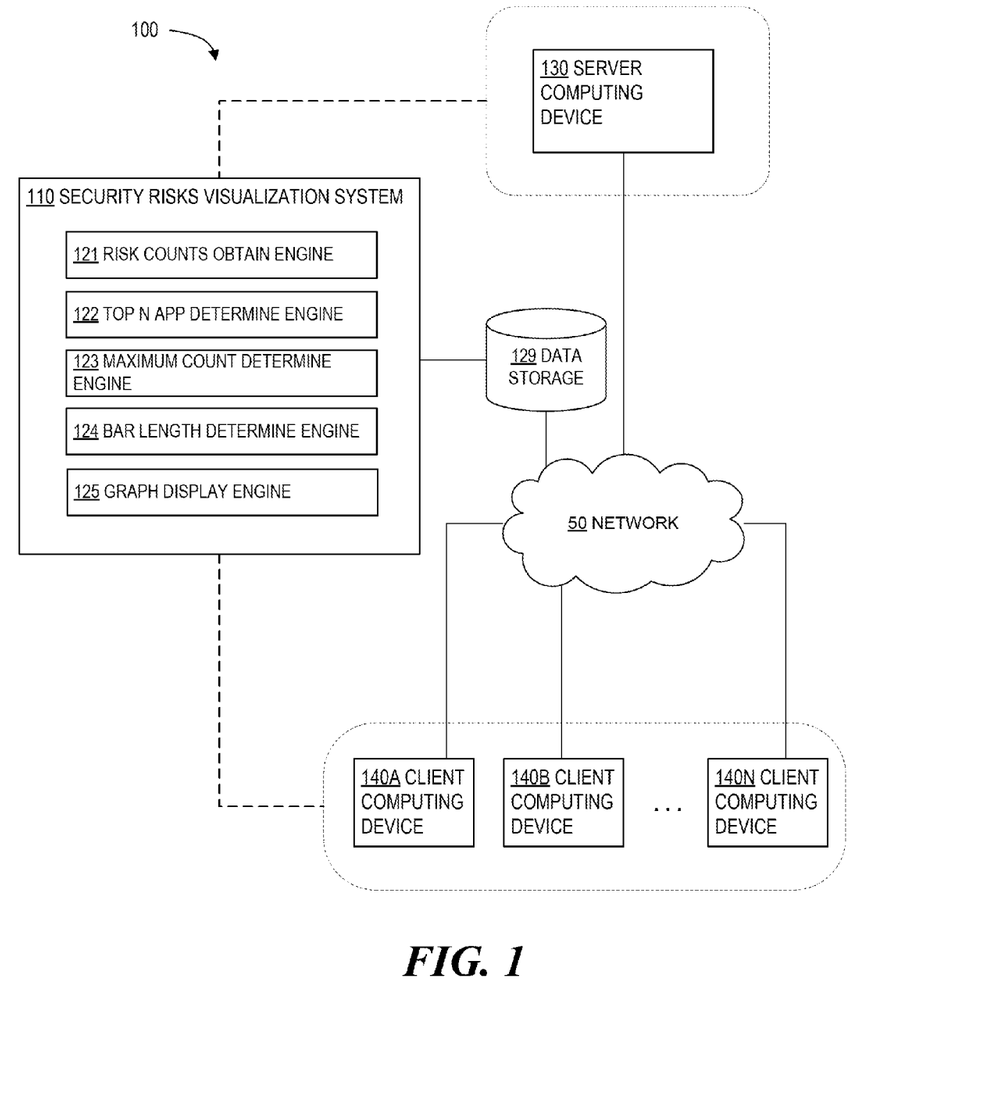
FIG. 1 is a block diagram depicting an example environment in which various examples may be implemented as a security risks visualization system.

FIG. 1 is an example environment 100 in which various examples may be implemented as a security risks visualization system 110. Environment 100 may include various components including server computing device 130 and client computing devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, security risks visualization system 110 and the various components described herein may be implemented in hardware and/or a combination of hardware and programming that configures hardware. Furthermore, in FIG. 1 and other Figures described herein, different numbers of components or entities than depicted may be used.

Security risks visualization system 110 may comprise a risk counts obtain engine 121, a top N application determine engine 122, a maximum count determine engine 123, a bar length determine engine 124, a graph display engine 125, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Risk counts obtain engine 121 may obtain counts of security risks found in a plurality of applications. An "application," as used herein, may refer to an executable application comprising code or machine readable instruction for implementing predetermined functions. An application may be exposed to and/or contain various security risks (e.g., security vulnerabilities) that can be exploited by different types of attacks.

A number of so-called scanning tools, for example, exist for scanning an application to assess the security risks and/or vulnerabilities of various aspects of the application. In this example, the security risks (and/or counts thereof) discovered by a scanning tool for an application or a plurality of applications may be obtained by risk counts obtain engine 121. Risks counts obtain engine 121 may obtain the security risks (and/or counts thereof) by various other ways.

The obtained counts may comprise a count of security risks associated with each of a plurality of severity levels found in each application of the plurality of applications. The plurality of severity levels may include multiple levels in different severity. For example, the plurality of severity levels may comprise a critical level, a high level, a medium level, and a low level. Using this example, the obtained counts for each application may include a first count of security risks associated with the critical level, a second count of security risks associated with the high level, a third count of security risks associated with the medium level, and a fourth count of security risks associated with the low level. Note that some of the first, second, third, and fourth counts may be zero if no security risks have been found for that particular severity level. As such, for a particular application, the obtained counts may include 45 critical-level security risks, 0 high-level security risk, 10 medium-level security risks, and 1 low-level security risk.

Top N applications determine engine 122 may determine and/or identify top N applications of the plurality of applications based on the obtained counts. The "N" may be a predetermined number that may be manually set (e.g., based on user input) and/or automatically set by system 110 (e.g., based on the total number of applications in the plurality of applications)

In some implementations, the top N applications may be determined by sorting the plurality of applications in accordance with their respective counts of security risks associated with each of the plurality of severity levels in descending order. In these implementations, a first application with a first count of security risks associated with a first severity level (e.g., a highest severity level with a count that is non-zero) may be sorted higher than a second application with a second count (e.g., that is lower than the first count) of security risks associated with the first severity level regardless of their respective counts of security risks associated with other severity levels that are lower in severity than the first severity level, given that the second application does not have a non-zero count of security risks associated with a severity level that is higher in severity that the first severity level.

For example, the counts of security risks found in the first application may include 45 critical-level security risks, 0 high-level security risk, 10 medium-level security risks, and 1 low-level security risk. And, the counts of the security risks found in the second application may include 15 critical-level security risks, 228 high-level security risks, 20 medium-level security risks, and 100 low-level security risks. Note that the highest severity level with a count that is non-zero for the first application is the critical severity level with the count of 45. In this example, the first application may be sorted higher than the second application because the count of critical-level security risks (e.g., 45) for the first application is higher than the count of the same-level security risks (e.g., 15) for the second application.

Consider another example: the second application may now include 0 critical-level security risk, 228 high-level security risks, 20 medium-level security risks, and 100 low-level security risks. There may be a third application with 0 critical-level security risk, 114 high-level security risks, 50 medium-level security risks, and 500 low-level security risks. Note that the highest severity level with a count that is non-zero for the second application is the high severity level with the count of 228. In this example, the second application may be sorted higher than the third application because the count of high-level security risks (e.g., 228) for the second application is higher than the count of the same-level security risks (e.g., 114) and the critical-level count is zero for the third application.

Maximum count determine engine 123 may determine a maximum count of security risks associated with each of the plurality of severity levels found in the plurality of applications. In other words, maximum count determine engine 123 may determine a first maximum count of security risks associated with a first severity level of the plurality of severity levels found in the plurality of applications, a second maximum count of security risks associated with a second severity level of the plurality of severity levels found in the plurality of applications, a third maximum count of security risks associated with a third severity level of the plurality of severity levels found in the plurality of applications, a fourth maximum count of security risks associated with a fourth severity level of the plurality of severity levels found in the plurality of applications, and so on. Note that the maximum counts for each of the severity levels are determined for all of the plurality of applications.

For example, the counts of security risks may be obtained for three different applications: the first application may have 45 critical-level security risks, 0 high-level risk, 10 medium-level risks, and 1 low-level risk; the second application may have 15 critical-level security risks, 228 high-level risks, 20 medium-level risks, and 100 low-level risks; and the third application may have 0 critical-level security risk, 114 high-level risks, 50 medium-level risks, and 500 low-level risk. In this example, the maximum counts of security risks for these three applications may include: 45 critical-level security risks, 228 high-level security risks, 50 medium-level security risks, and 500 low-level security risks. Note that the maximum counts may be different if additional applications are included in the plurality of applications.

In some implementations, maximum count determine engine 123 may determine a maximum count of security risks associated with each of the plurality of severity levels found in the top N applications (e.g., determined and/or identified by top N applications determine engine 122). In other words, maximum count determine engine 123 may determine a first maximum count of security risks associated with the first severity level found in the top N applications, a second maximum count of security risks associated with the second severity level found in the top N applications, a third maximum count of security risks associated with the third severity level found in the top N applications, a fourth maximum count of security risks associated with the fourth severity level found in the top N applications, and so on. Note that the maximum counts for each of the severity levels are determined for the top N applications rather than for all of the plurality of applications.

To enable easy relative comparison of security risks among different applications, a bar graph may be generated with a bar representing an application with a bar length that is determined relative to other bars representing other applications (e.g., as discussed herein with respect to bar length determine engine 124).

Bar length determine engine 124 may determine a bar length of a bar to be included in a bar graph. In some implementations, the bar graph may be divided into a plurality of bar sections. Each of the plurality of bar sections may correspond to a severity level (e.g., a first bar section of the plurality of bar sections corresponding to the first severity level and a second bar section of the plurality of bar sections corresponding to a second severity level that is lower in severity than the first severity level).

Figure 7:
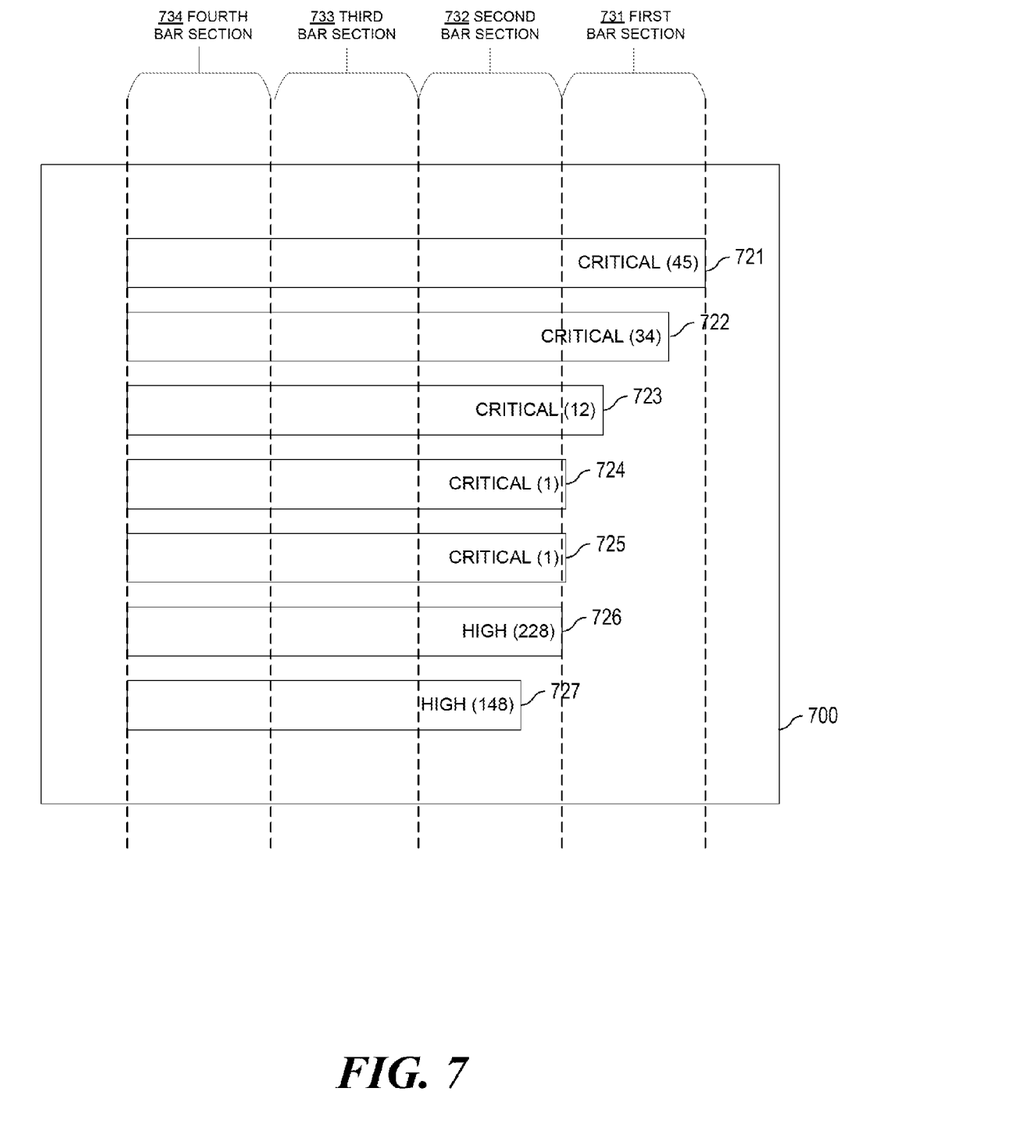
FIG. 7 is a diagram depicting an example bar graph for visualization of security risks.

An example bar graph is illustrated in FIG. 7. In the example illustrated in FIG. 7, the bar graph may be divided into 4 bar sections including: a first bar section (e.g., item 731 of FIG. 7) corresponding to the critical severity level, a second bar section (e.g., item 732 of FIG. 7) corresponding to the high severity level, a third bar section (e.g., item 733 of FIG. 7) corresponding to the medium severity level, and a fourth bar section (e.g., item 734 of FIG. 7) corresponding to the low severity level. In this example, the bar graph may include 7 bars (e.g., items 721-727 of FIG. 7). Each of the 7 bars may be associated with individual applications of the plurality of applications (or the top 7 applications of the plurality of applications). Consider the following example scenario:

A first application (e.g., represented by item 721 of FIG. 7) may include 45 critical-level risks, 0 high-level risk, 10 medium-level risks, and 1 low-level risk. A second application (e.g., represented by item 722 of FIG. 7) may include 34 critical-level risks, 223 high-level risks, 44 medium-level risks, and 198 low-level risk. A third application (e.g., represented by item 723 of FIG. 7) may include 12 critical-level risks, 38 high-level risks, 222 medium-level risks, and 13 low-level risk. A fourth application (e.g., represented by item 724 of FIG. 7) may include 1 critical-level risk, 23 high-level risks, 338 medium-level risks, and 1 low-level risk. A fifth application (e.g., represented by item 725 of FIG. 7) may include 1 critical-level risk, 0 high-level risk, 93 medium-level risks, and 122 low-level risk. A sixth application (e.g., represented by item 726 of FIG. 7) may include 0 critical-level risk, 228 high-level risks, 10 medium-level risks, and 1 low-level risk. A seventh application (e.g., represented by item 727 of FIG. 7) may include 0 critical-level risk, 148 high-level risks, 10 medium-level risks, and 1 low-level risk. Further, the maximum risks (e.g., determined by maximum count determine engine 123) may include 45 critical-level risks, 228 high-level risks, 338 medium-level risks, and 198 low-level risks, provided that the above 7 applications represent the top 7 applications and the maximum risks are determined based on the counts of security risks found in the top 7 applications rather than all of the plurality of applications.

Bar length determine engine 124 may identify, for the first application, a highest severity level with a count of security risks that is non-zero. In the example scenario above, the first application has the non-zero count of 45 critical-level risks. Bar length determine engine 124 may determine a percentage value by dividing 45 by the maximum count associated with the critical severity level (e.g., 45), resulting in the percentage value of 100%. Bar length determine engine 124 may determine a partial length of the first bar section (e.g., associated with the critical severity level) by multiplying the percentage value (e.g., 100%) and a total length of the first bar section. In this example, the partial length of the first bar section for the first application is equal to the total length (e.g., 100% of the total length) of the first bar section. Note that the bar length of a first bar (e.g., item 721 of FIG. 7) may include the partial length of the first bar section as determined by bar length determine engine 124 and the total lengths of the second, third, and fourth bar sections.

Bar length determine engine 124 may identify, for the second application, a highest severity level with a count of security risks that is non-zero. In the example scenario above, the second application has the non-zero count of 34 critical-level risks. Bar length determine engine 124 may determine a percentage value by dividing 34 by the maximum count associated with the critical severity level (e.g., 45), resulting in the percentage value of 76%. Bar length determine engine 124 may determine a partial length of the first bar section (e.g., associated with the critical severity level) by multiplying the percentage value (e.g., 76%) and a total length of the first bar section. In this example, the partial length of the first bar section for the second application is equal to 76% of the total length of the first bar section. Note that the bar length of a second bar (e.g., item 722 of FIG. 7) may include the partial length of the first bar section as determined by bar length determine engine 124 and the total lengths of the second, third, and fourth bar sections. The bar lengths of a third bar (e.g., item 723 of FIG. 7), a fourth bar (e.g., item 724 of FIG. 7), and/or a fifth bar (e.g., item 725 of FIG. 7) may be similarly determined.

Bar length determine engine 124 may identify, for the sixth application, a highest severity level with a count of security risks that is non-zero. In the example scenario above, the sixth application has the non-zero count of 228 high-level risks. Bar length determine engine 124 may determine a percentage value by dividing 228 by the maximum count associated with the high severity level (e.g., 228), resulting in the percentage value of 100%. Bar length determine engine 124 may determine a partial length of the second bar section (e.g., associated with the high severity level) by multiplying the percentage value (e.g., 100%) and a total length of the second bar section. In this example, the partial length of the second bar section for the sixth application is equal to the total length (e.g., 100% of the total length) of the second bar section. Note that the bar length of a sixth bar (e.g., item 726 of FIG. 7) may include the partial length of the second bar section as determined by bar length determine engine 124 and the total lengths of the third and fourth bar sections.

Bar length determine engine 124 may identify, for the seventh application, a highest severity level with a count of security risks that is non-zero. In the example scenario above, the seventh application has the non-zero count of 148 high-level risks. Bar length determine engine 124 may determine a percentage value by dividing 148 by the maximum count associated with the high severity level (e.g., 228), resulting in the percentage value of 65%. Bar length determine engine 124 may determine a partial length of the second bar section (e.g., associated with the high severity level) by multiplying the percentage value (e.g., 65%) and a total length of the second bar section. In this example, the partial length of the second bar section for the seventh application is equal to 65% of the total length of the second bar section. Note that the bar length of a seventh bar (e.g., item 727 of FIG. 7) may include the partial length of the second bar section as determined by bar length determine engine 124 and the total lengths of the third and fourth bar sections.

Graph display engine 125 may cause a display of the bar graph (e.g., bar graph 700 of FIG. 7) that may include at least a bar having the bar length determined by bar length determine engine 124. In some implementations, the bar graph may include a plurality of bars each of which corresponds to individual applications of the plurality of applications. In some implementations, the bar graph may include a plurality of bars each of which corresponds to individual applications of the top N applications (e.g., determined and/or identified by top N applications determine engine 122). In some implementations, the bar graph may present the security risk information not only by application but also by various other categories including but not being limited to: by application category (e.g., a first category of database-related applications, a second category of security-related applications, etc.), by department, and by region. In these implementations, a bar of the bar graph may represent the counts for more than one application aggregated by a specified category (e.g., application category, department, region, etc.).

In some implementations, graph display engine 125 may cause a display of an indication of a severity level along with a bar (e.g., within the bar or adjacent to the bar) in the bar graph. In some implementations, graph display engine 125 may cause a display of the count of security risks associated with the severity level along with the bar (e.g., within the bar or adjacent to the bar) in the bar graph. Returning to the example illustrated in FIG. 7, the first bar (e.g., item 721 of FIG. 7) may show an indication of the highest severity level (e.g., "CRITICAL") with a non-zero count (e.g., 45) of security risks found in the first application. Similarly, the sixth bar (e.g., item 726 of FIG. 7) may show an indication of the highest severity level (e.g., "HIGH") with a non-zero count (e.g., 228) of security risks found in the sixth application.

In performing their respective functions, engines 121-125 may access data storage 129 and/or other suitable database(s). Data storage 129 may represent any memory accessible to security risks visualization system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Security risks visualization system 110 may access data storage 129 locally or remotely via network 50 or other networks.

Data storage 129 may include a database to organize and store data. Database 129 may be, include, or interface to, for example, an Oracle™ relational database sold commercially by Oracle Corporation. Other databases, such as Informix™, DB2 (Database 2) or other data storage, including file-based (e.g., comma or tab separated files), or query formats, platforms, or resources such as OLAP (On Line Analytical Processing), SQL (Structured Query Language), a SAN (storage area network), Microsoft Access™, MySQL, PostgreSQL, HSpace, Apache Cassandra, MongoDB, Apache CouchDB™, or others may also be used, incorporated, or accessed. The database may reside in a single or multiple physical device(s) and in a single or multiple physical location(s). The database may store a plurality of types of data and/or files and associated data or file description, administrative information, or any other data.

Figure 2:
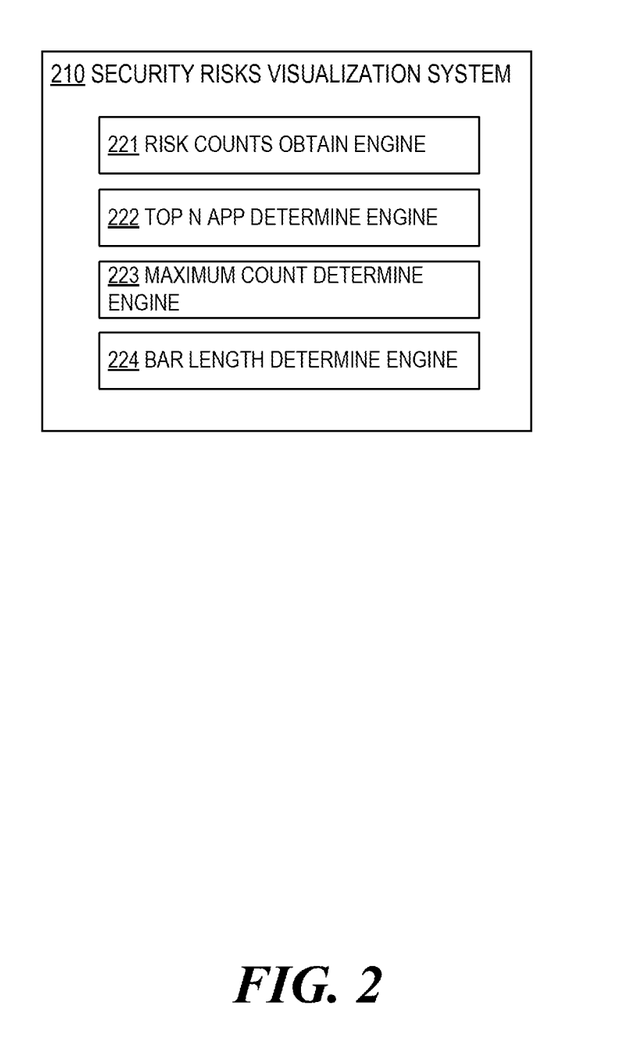
FIG. 2 is a block diagram depicting an example security risks visualization system.

FIG. 2 is a block diagram depicting an example security risks visualization system 210. Security risks visualization system 210 may comprise a risk counts obtain engine 221, a top N applications determine engine 222, a maximum count determine engine 223, a bar length determine engine 224, and/or other engines. Engines 221-224 represent engines 121-124, respectively.

Figure 3:
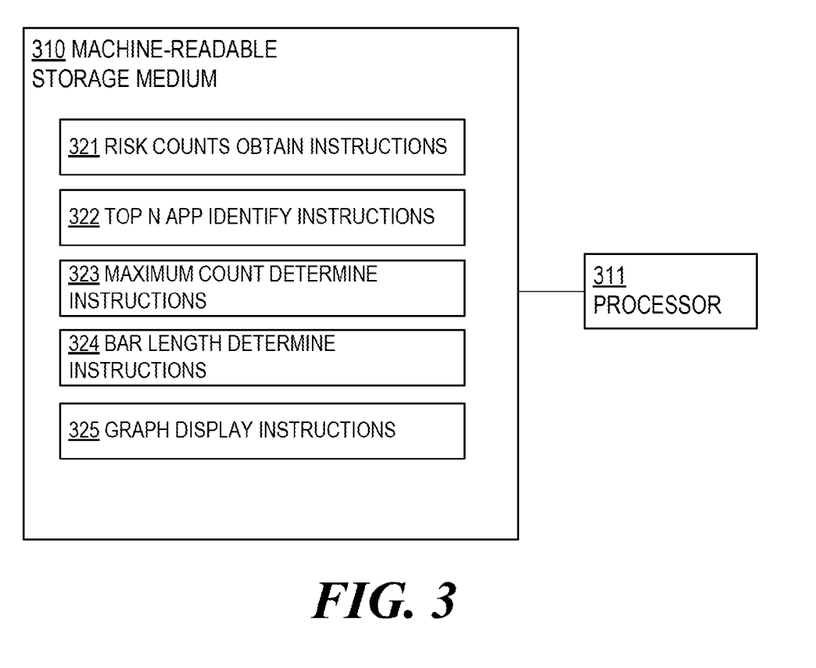
FIG. 3 is a block diagram depicting an example machine-readable storage medium comprising instructions executable by a processor for visualization of security risks.

FIG. 3 is a block diagram depicting an example machine-readable storage medium 310 comprising instructions executable by a processor for visualization of security risks.

In the foregoing discussion, engines 121-125 were described as combinations of hardware and programming. Engines 121-125 may be implemented in a number of fashions. Referring to FIG. 3, the programming may be processor executable instructions 321-325 stored on a machine-readable storage medium 310 and the hardware may include a processor 311 for executing those instructions. Thus, machine-readable storage medium 310 can be said to store program instructions or code that when executed by processor 311 implements security risks visualization system 110 of FIG. 1.

In FIG. 3, the executable program instructions in machine-readable storage medium 310 are depicted as risk counts obtain instructions 321, top N applications identify instructions 322, maximum count determine instructions 323, bar length determine instructions 324, and graph display instructions 325. Instructions 321-325 represent program instructions that, when executed, cause processor 311 to implement engines 121-125, respectively.

Figure 4:
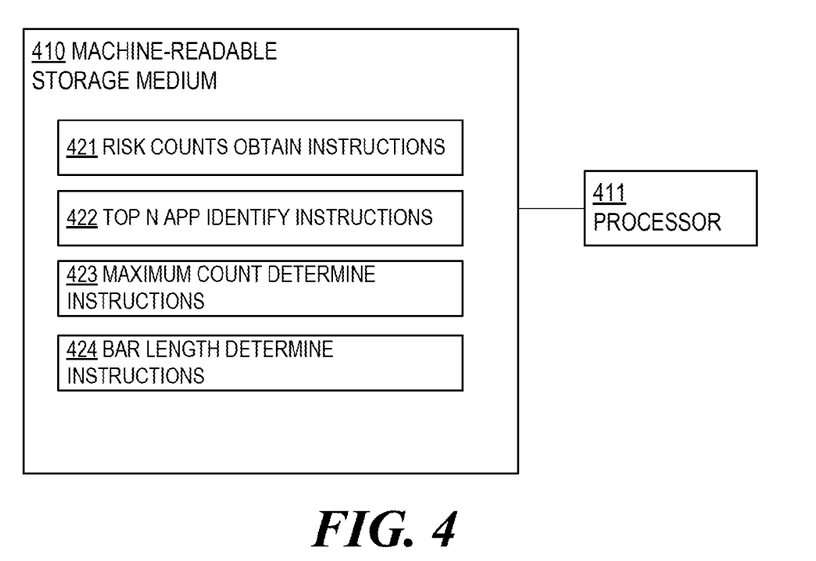
FIG. 4 is a block diagram depicting an example machine-readable storage medium comprising instructions executable by a processor for visualization of security risks.

FIG. 4 is a block diagram depicting an example machine-readable storage medium 410 comprising instructions executable by a processor for visualization of security risks.

In the foregoing discussion, engines 121-125 were described as combinations of hardware and programming. Engines 121-125 may be implemented in a number of fashions. Referring to FIG. 4, the programming may be processor executable instructions 421-424 stored on a machine-readable storage medium 410 and the hardware may include a processor 411 for executing those instructions. Thus, machine-readable storage medium 410 can be said to store program instructions or code that when executed by processor 411 implements security risks visualization system 110 of FIG. 1.

In FIG. 4, the executable program instructions in machine-readable storage medium 410 are depicted as risk counts obtain instructions 421, top N applications identify instructions 422, maximum count determine instructions 423, and bar length determine instructions 424. Instructions 421-424 represent program instructions that, when executed, cause processor 411 to implement engines 121-124, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement security risks visualization system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-325, and/or other instructions. As an alternative or in addition to retrieving and executing instructions, processor 311 may include at least one electronic circuit comprising a number of electronic components for performing the functionality of at least one of instructions 321-325, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-424, and/or other instructions. As an alternative or in addition to retrieving and executing instructions, processor 411 may include at least one electronic circuit comprising a number of electronic components for performing the functionality of at least one of instructions 421-424, and/or other instructions.

Figure 5:
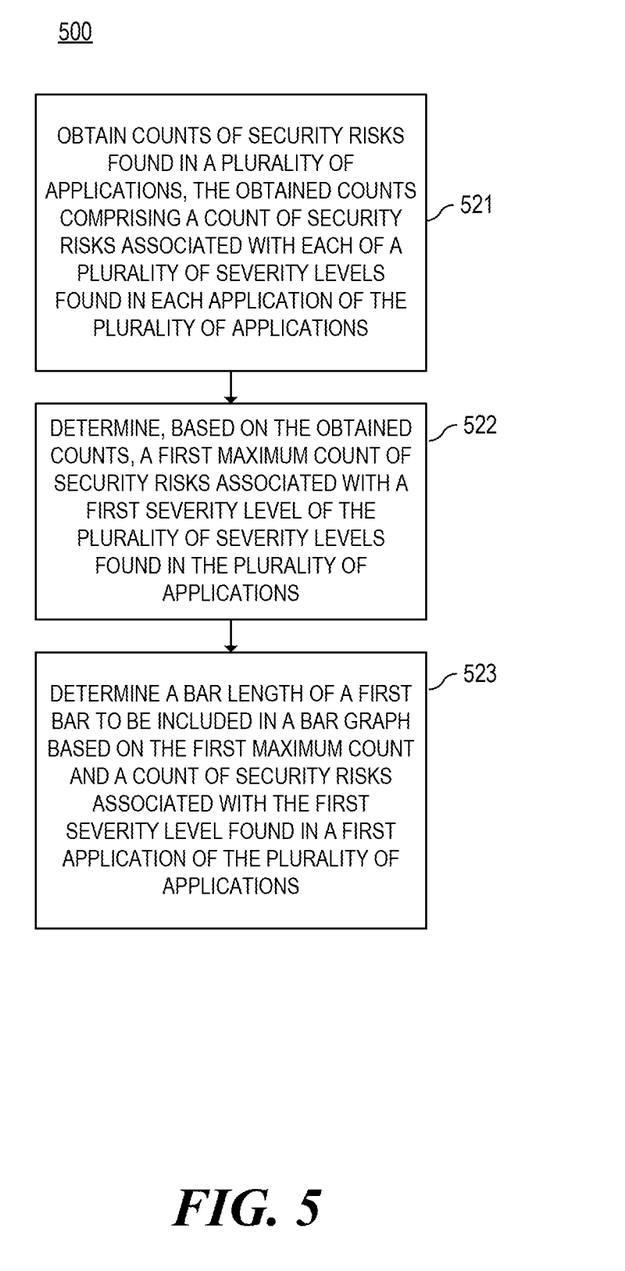
FIG. 5 is a flow diagram depicting an example method for visualization of security risks.

FIG. 5 is a flow diagram depicting an example method 500 for visualization of security risks. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant to be an example and, as such, should not be viewed as limiting. Method 500 may be implemented in the form of executable instructions stored on a machine-readable storage medium, such as storage medium 310, and/or in the form of electronic circuitry.

In block 521, method 500 may include obtaining counts of security risks found in a plurality of applications. A number of so-called scanning tools, for example, exist for scanning an application to assess the security risks and/or vulnerabilities of various aspects of the application. In this example, the security risks (and/or counts thereof) discovered by a scanning tool for an application or a plurality of applications may be obtained in block 521. The security risks (and/or counts thereof) may be obtained by various other ways. The obtained counts may comprise a count of security risks associated with each of a plurality of severity levels found in each application of the plurality of applications. The plurality of severity levels may include multiple levels in different severity. For example, the plurality of severity levels may comprise a critical level, a high level, a medium level, and a low level. Using this example, the obtained counts for each application may include a first count of security risks associated with the critical level, a second count of security risks associated with the high level, a third count of security risks associated with the medium level, and a fourth count of security risks associated with the low level. Note that some of the first, second, third, and fourth counts may be zero if no security risks have been found for that particular severity level.

In block 522, method 500 may include determining, based on the obtained counts, a first maximum count of security risks associated with a first severity level of the plurality of severity levels found in the plurality of applications. For example, the counts of security risks may be obtained for three different applications: the first application may have 45 critical-level security risks, 0 high-level risk, 10 medium-level risks, and 1 low-level risk; the second application may have 15 critical-level security risks, 228 high-level risks, 20 medium-level risks, and 100 low-level risks; and the third application may have 0 critical-level security risk, 114 high-level risks, 50 medium-level risks, and 500 low-level risk. In this example, the maximum counts of security risks for these three applications may include: 45 critical-level security risks, 228 high-level security risks, 50 medium-level security risks, and 500 low-level security risks. Note that the maximum counts may be different if additional applications are included in the plurality of applications.

In block 523, method 500 may include determining a bar length of a first bar to be included in a bar graph based on the first maximum count and the count of security risks associated with the first severity level found in a first application of the plurality of applications. The first severity level may be a highest severity level with a non-zero count of security risks found in the first application. By dividing the count associated with the first severity level found in the first application by the first maximum count, a partial length of a first bar section (e.g., corresponding to the first severity level) of the first bar may be determined. As such, the bar length of the first bar may include the partial length of the first bar section and/or the total lengths of the rest of bar sections that are lower in severity than the first severity level.

Referring back to FIG. 1, risk counts obtain engine 121 may be responsible for implementing block 521. Maximum count determine engine 123 may be responsible for implementing block 522. Bar length determine engine 124 may be responsible for implementing block 523.

Figure 6:
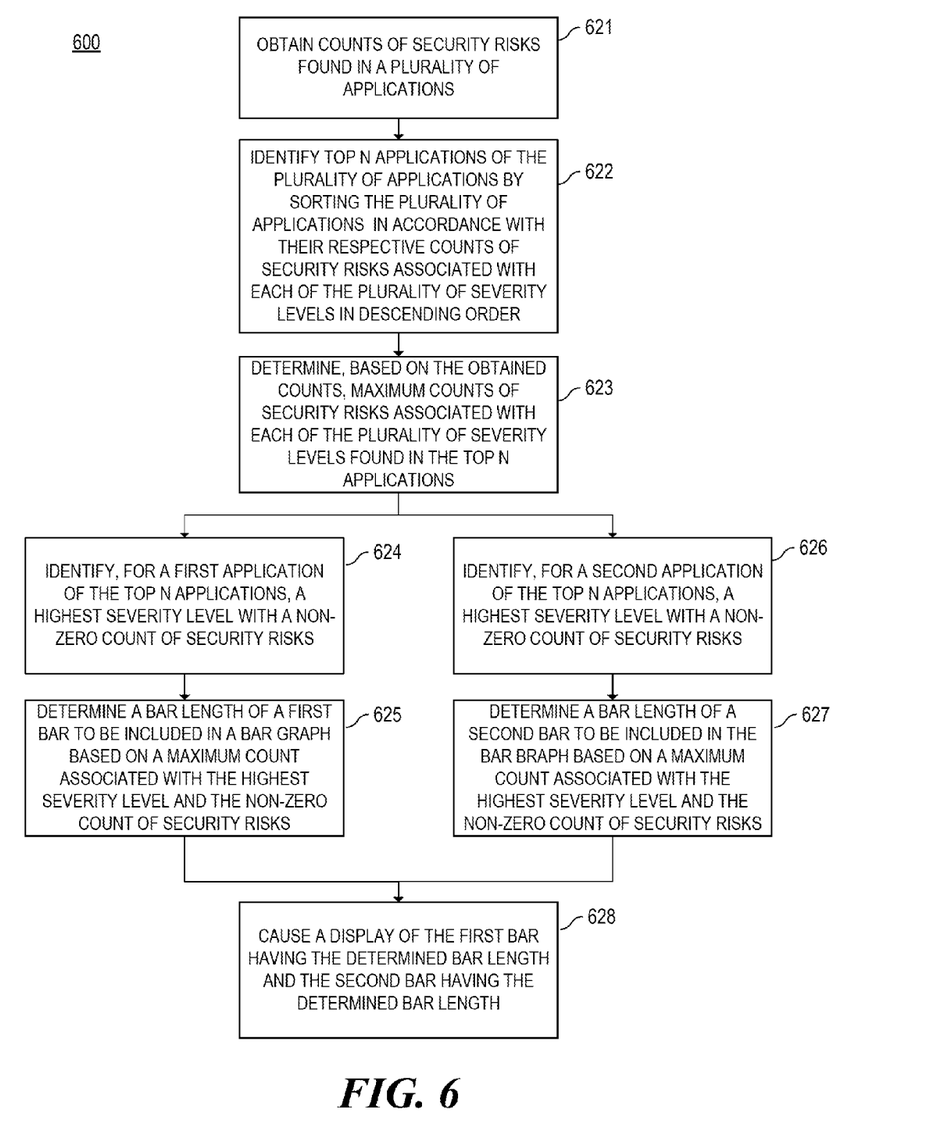
FIG. 6 is a flow diagram depicting an example method for visualization of security risks.

FIG. 6 is a flow diagram depicting an example method 600 for visualization of security risks. Method 600 as illustrated (and described in greater detail below) is meant be an example and, as such, should not be viewed as limiting. Method 600 may be implemented in the form of executable instructions stored on a machine-readable storage medium, such as storage medium 210, and/or in the form of electronic circuitry.

In block 621, method 600 may include obtaining counts of security risks found in a plurality of applications. A number of so-called scanning tools, for example, exist for scanning an application to assess the security risks and/or vulnerabilities of various aspects of the application. In this example, the security risks (and/or counts thereof) discovered by a scanning tool for an application or a plurality of applications may be obtained in block 621. The security risks (and/or counts thereof) may be obtained by various other ways. The obtained counts may comprise a count of security risks associated with each of a plurality of severity levels found in each application of the plurality of applications. The plurality of severity levels may include multiple levels in different severity. For example, the plurality of severity levels may comprise a critical level, a high level, a medium level, and a low level. Using this example, the obtained counts for each application may include a first count of security risks associated with the critical level, a second count of security risks associated with the high level, a third count of security risks associated with the medium level, and a fourth count of security risks associated with the low level. Note that some of the first, second, third, and fourth counts may be zero if no security risks have been found for that particular severity level.

In block 622, method 600 may include identifying top N applications of the plurality of applications. The "N" may be a predetermined number that may be manually set (e.g., based on user input) and/or automatically set by system 110 (e.g., based on the total number of applications in the plurality of applications). In some implementations, the top N applications may be determined by sorting the plurality of applications in accordance with their respective counts of security risks associated with each of the plurality of severity levels in descending order. In these implementations, a first application with a first count of security risks associated with a first severity level (e.g., a highest severity level with a count that is non-zero) may be sorted higher than a second application with a second count (e.g., that is lower than the first count) of security risks associated with the first severity level regardless of their respective counts of security risks associated with other severity levels that are lower in severity than the first severity level, given that the second application does not have a non-zero count of security risks associated with a severity level that is higher in severity that the first severity level.

In block 623, method 600 may include determining, based on the obtained counts, maximum counts of security risks associated with each of the plurality of severity levels found in the top N applications. For example, the top 3 applications may include the following counts of security risks: the first application may have 45 critical-level security risks, 0 high-level risk, 10 medium-level risks, and 1 low-level risk; the second application may have 15 critical-level security risks, 228 high-level risks, 20 medium-level risks, and 100 low-level risks; and the third application may have 0 critical-level security risk, 114 high-level risks, 50 medium-level risks, and 500 low-level risk. In this example, the maximum counts of security risks for the top 3 applications may include: 45 critical-level security risks, 228 high-level security risks, 50 medium-level security risks, and 500 low-level security risks. Note that the maximum counts may be different if additional applications are included in the top N applications.

In block 624, method 600 may include identifying, for a first application of the top N applications, a highest severity level with a non-zero count of security risks. Continuing with the example above, the highest severity level with a non-zero count of security risks for the first application is the critical severity level with the count of 45.

In block 625, method 600 may include determining a bar length of a first bar to be included in a bar graph based on a maximum count associated with the highest severity level (e.g., the maximum count of 45 critical-level risks) and the non-zero count of security risks (e.g., 45). By dividing the non-zero count (e.g., 45) by the maximum count (e.g., 45), a partial length of a first bar section (e.g., corresponding to the critical severity level) of the first bar may be determined. As such, the bar length of the first bar may include the partial length of the first bar section (e.g., 100% of the total length of the first bar section) and/or the total lengths of the rest of bar sections that are lower in severity than the highest severity level.

In block 626, method 600 may include identifying, for a second application of the top N applications, a highest severity level with a non-zero count of security risks. Continuing with the example above, the highest severity level with a non-zero count of security risks for the second application is the critical severity level with the count of 15.

In block 627, method 600 may include determining a bar length of a second bar to be included in the bar graph based on a maximum count associated with the highest severity level (e.g., the maximum count of 45 critical-level risks) and the non-zero count of security risks (e.g., 15). By dividing the non-zero count (e.g., 15) by the maximum count (e.g., 45), a partial length of a first bar section (e.g., corresponding to the critical severity level) of the first bar may be determined. As such, the bar length of the first bar may include the partial length of the first bar section (e.g., 33% of the total length of the first bar section) and/or the total lengths of the rest of bar sections that are lower in severity than the highest severity level.

In block 628, method 600 may include causing a display of the first bar having the determined bar length and the second bar having the determined bar length.

Referring back to FIG. 1, risk counts obtain engine 121 may be responsible for implementing block 621. Top N applications determine engine 122 may be responsible for implementing block 622. Maximum count determine engine 123 may be responsible for implementing block 623. Bar length determine engine 124 may be responsible for implementing blocks 624-627. Graph display engine 125 may be responsible for implementing block 628.

FIG. 7 is a diagram depicting an example bar graph 700 for visualization of security risks. FIG. 7 is discussed herein with respect to FIG. 1

The foregoing disclosure describes a number of example implementations for visualization of security risks. The disclosed examples may include systems, devices, computer-readable storage media, and methods for visualization of security risks. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for visualization of security risks, the method comprising:
obtaining counts of security risks found in a plurality of applications, the obtained counts comprising a count of security risks associated with each of a plurality of severity levels found in each application of the plurality of applications;
determining, based on the obtained counts, a first maximum count of security risks associated with a first severity level of the plurality of severity levels found in the plurality of applications; and
determining a bar length of a first bar to be included in a bar graph based on the first maximum count and a count of security risks associated with the first severity level found in a first application of the plurality of applications, the bar graph divided into a plurality of bar sections, a first bar section of the plurality of bar sections corresponding to the first severity level and a second bar section of the plurality of bar sections corresponding to a second severity level that is lower in severity than the first severity level, wherein the bar length of the first bar is determined by including at least a total length of the second bar section.

2. The method of claim 1,
wherein the first severity level for the first application is a highest severity level with a count of security risks that is non-zero.

3. The method of claim 1, further comprising:
determining, based on the obtained counts, a second maximum count of security risks associated with the second severity level found in the plurality of applications;
identifying, as the second severity level for a second application of the plurality of applications, a highest severity level with a count of security risks that is non-zero; and
determining a bar length of a second bar to be included in the bar graph based on the second maximum count and the count of security risks associated with the second severity level found in the second application.

4. The method of claim 1, further comprising:
identifying top N applications of the plurality of applications by sorting the plurality of applications in accordance with their respective counts of security risks associated with each of the plurality of severity levels in descending order, wherein the first application is one of the top N applications.

5. The method of claim 1, wherein determining the bar length of the first bar comprises:
determining the bar length of the first bar based on dividing the count of security risks associated with the first severity level found in the first application by the first maximum count.

6. The method of claim 1, further comprising:
determining a percentage of a total length of the first bar section by dividing the count of security risks associated with the first severity level found in the first application by the first maximum count; and
determining the bar length of the first bar by including at least the percentage of the total length of the first bar section.

7. The method of claim 1, further comprising:
causing a display of the bar graph that includes the first bar having the determined bar length.

8. The method of claim 7, further comprising at least one of:
causing the display of an indication of the first severity level within the first bar or adjacent to the first bar; and
causing the display of the count of security risks associated with the first severity level found in the first application within the first bar or adjacent to the first bar.

9. A non-transitory machine-readable storage medium comprising instructions executable by a processor of a computing device for visualization of security risks, the machine-readable storage medium comprising:
instructions to obtain counts of security risks found in a plurality of applications, the obtained counts comprising a count of security risks associated with each of a plurality of severity levels found in each application of the plurality of applications;
instructions to identify top N applications of the plurality of applications by sorting the plurality of applications in accordance with their respective counts of security risks associated with each of the plurality of severity levels in descending order;
instructions to determine, based on the obtained counts, a first maximum count of security risks associated with a first severity level of the plurality of severity levels found in the top N applications; and
instructions to determine a bar length of a bar to be included in a bar graph based on the first maximum count and a first count of security risks associated with the first severity level found in a first application of the top N applications, the bar graph divided into a plurality of bar sections, a first bar section of the plurality of bar sections associated with the first severity level and a second bar section of the plurality of bar sections associated with a second severity level that is lower in severity than the first severity level, wherein the bar length of the bar is determined by including at least a total length of the second bar section.

10. The non-transitory machine-readable storage medium of claim 9, wherein the first application with the first count is sorted higher than a second application with a second count of security risks associated with the first severity level regardless of their respective counts of security risks associated with other severity levels that are lower in severity than the first severity level, wherein the second count is lower than the first count.

11. The non-transitory machine-readable storage medium of claim 9,
   wherein the first severity level for the first application is a highest severity level with the first count of security risks that is non-zero.

12. The non-transitory machine-readable storage medium of claim 9, wherein determining the bar length of the bar comprises:
   instructions to determine the bar length of the bar based on dividing the first count by the first maximum count.

13. The non-transitory machine-readable storage medium of claim 9, further comprising:
   instructions to determine a percentage value by dividing the first count by the first maximum count; and
   instructions to determine a partial length of the first bar section by multiplying the percentage value and a total length of the first bar section, the bar length of the bar including at least the partial length of the first bar section.

14. The non-transitory machine-readable storage medium of claim 9, further comprising:
   instructions to cause the bar graph that includes the bar having the bar length to be displayed along with at least one of: an indication of the first severity level and the first count.

15. The non-transitory machine-readable storage medium of claim 9, further comprising:
   instructions to cause the bar graph that includes a plurality of bars to be displayed, each of the plurality of bars corresponding to each of the top N applications.

16. A system for visualization of security risks comprising:
   a processor that:
      obtains counts of security risks found in a plurality of applications, the obtained counts comprising a count of security risks associated with each of a plurality of severity levels found in each application of the plurality of applications;
      determines top N applications of the plurality of applications based on the obtained counts;
      determines a first maximum count of security risks associated with a first severity level of the plurality of severity levels found in the top N applications; and
      determines a bar length of a first bar to be included in a bar graph based on dividing a first count of security risks associated with the first severity level found in a first application of the top N applications by the first maximum count, the bar graph divided into a plurality of bar sections, a first bar section of the plurality of bar sections corresponding to the first severity level and a second bar section of the plurality of bar sections corresponding to a second severity level that is lower in severity than the first severity level, wherein the bar length of the first bar is determined by including at least a total length of the second bar section.

17. The system of claim 16, where determining the top N applications comprises:
   sorting the plurality of applications in accordance with their respective counts of security risks associated with each of the plurality of severity levels in descending order.

18. The system of claim 16, the processor that:
   determines a percentage of a total length of the first bar section by dividing the first count by the first maximum count; and
   determines the bar length of the first bar by including at least the percentage of the total length of the first bar section.

19. The system of claim 16, the processor that:
   determines a bar length of a second bar to be included in the bar graph based on dividing a second count of security risks associated with the first severity level found in a second application of the top N applications by the first maximum count.

20. The system of claim 19, the processor that:
   causes a display of the bar graph that includes the first bar with the determined bar length of the first bar and the second bar with the determined bar length of the second bar.

* * * * *